(12) United States Patent
Lo

(10) Patent No.: US 9,749,237 B2
(45) Date of Patent: Aug. 29, 2017

(54) METHOD AND APPARATUS FOR AGGREGATING AND ENCODING RECEIVED SYMBOLS INCLUDING GENERATION OF A POINTER FOR A CONTROL CODE

(71) Applicant: Marvell World Trade LTD., St. Michael (BB)

(72) Inventor: William Lo, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 231 days.

(21) Appl. No.: 14/625,832

(22) Filed: Feb. 19, 2015

(65) Prior Publication Data

US 2015/0244620 A1    Aug. 27, 2015

Related U.S. Application Data

(60) Provisional application No. 61/943,272, filed on Feb. 21, 2014.

(51) Int. Cl.
*H04L 25/49* (2006.01)
*H04L 12/741* (2013.01)

(52) U.S. Cl.
CPC .......... *H04L 45/74* (2013.01); *H04L 25/4908* (2013.01)

(58) Field of Classification Search
CPC . G06F 7/00; G06F 11/00; G06F 15/16; G06F 17/22; G06F 17/28; H04B 1/38; H04J 3/02; H04J 3/24; H04L 5/14; H04L 12/28; H04L 12/56; H04L 12/741; H04L 25/49; H04L 45/74; H03M 7/40; H03M 13/00

USPC ........ 370/295, 392, 474, 509, 538; 375/222, 375/242, 260; 709/236, 249, 250; 714/752

See application file for complete search history.

(56) References Cited

U.S. PATENT DOCUMENTS

| | | | |
|---|---|---|---|
| 7,251,699 B1 | 7/2007 | Lo | |
| 7,627,023 B1* | 12/2009 | Lo | H04L 69/22 375/222 |
| 7,639,687 B1* | 12/2009 | Tsai | H04L 25/4908 370/392 |
| 2002/0156913 A1* | 10/2002 | Tsang | H04J 3/1617 709/236 |
| 2010/0070822 A1* | 3/2010 | Leung | H04L 1/0072 714/752 |

OTHER PUBLICATIONS

"49. Physical Coding Sublayer (PCS) sublayer for 64b/66b, type 10GBASE-R"; IEEE Draft P802.3ae/D2.0; Dec. 1, 2000; pp. 283-308.

(Continued)

*Primary Examiner* — Shawkat M Ali

(57) ABSTRACT

A data processing system including an interface and an encoder. The interface is configured to receive first symbols from one or more ports. The interface is configured to aggregate a predetermined number of the first symbols to provide second symbols. The encoder is configured to (i) generate a header, and (ii) encode the second symbols to generate third symbols, where the header indicates whether the third symbols include a set of control codes. Responsive to the third symbols including the set of control codes, the encoder is configured to generate a pointer for the set of control codes, where the pointer can assume more values than are in the set of control codes.

25 Claims, 14 Drawing Sheets

(56) References Cited

OTHER PUBLICATIONS

International Search Report and Written Opinion for PCT Application No. PCT/US2015/016654 mailed Jun. 2, 2015; 12 pages.
IEEE Part 3: Carrier Sense Multiple Access with Collision Detection (CSMA/CD) Access Method and Physical Layer Specifications; 802.3: 2002.

* cited by examiner

FIG. 3
_Prior Art_

| Input Data | S Y N C | | | Block Payload | | | | | | | |
|---|---|---|---|---|---|---|---|---|---|---|---|
| Encoded Block Format: | | 0 | 1 | 2 | | | | | | | 65 |
| $D_0D_1D_2D_3/D_4D_5D_6D_7$ | | 0 | 1 | $D_0$ | $D_1$ | $D_2$ | $D_3$ | $D_4$ | $D_5$ | $D_6$ | $D_7$ |
| Control Block Formats: | | | | Block Type Field | | | | | | | |
| $C_0C_1C_2C_3/C_4C_5C_6C_7$ | | 1 | 0 | 0x1e | $C_0$ | $C_1$ | $C_2$ | $C_3$ | $C_4$ | $C_5$ | $C_6$ $C_7$ |
| $C_0C_1C_2C_3/O_4D_5D_6D_7$ | | 1 | 0 | 0x2d | $C_0$ | $C_1$ | $C_2$ | $C_3$ | $O_4$ | $D_5$ | $D_6$ $D_7$ |
| $C_0C_1C_2C_3/S_4D_5D_6D_7$ | | 1 | 0 | 0x33 | $C_0$ | $C_1$ | $C_2$ | $C_3$ | | $D_5$ | $D_6$ $D_7$ |
| $O_0D_1D_2D_3/S_4D_5D_6D_7$ | | 1 | 0 | 0x66 | | $D_1$ | $D_2$ | $D_3$ | | $D_5$ | $D_6$ $D_7$ |
| $O_0D_1D_2D_3/O_4D_5D_6D_7$ | | 1 | 0 | 0x55 | $O_0$ | $D_1$ | $D_2$ | $D_3$ | $O_4$ | $D_5$ | $D_6$ $D_7$ |
| $S_0D_1D_2D_3/D_4D_5D_6D_7$ | | 1 | 0 | 0x78 | | $D_1$ | $D_2$ | $D_3$ | $D_4$ | $D_5$ | $D_6$ $D_7$ |
| $O_0D_1D_2D_3/C_4C_5C_6C_7$ | | 1 | 0 | 0x4b | $O_0$ | $D_1$ | $D_2$ | $D_3$ | $C_4$ | $C_5$ | $C_6$ $C_7$ |
| $T_0C_1C_2C_3/C_4C_5C_6C_7$ | | 1 | 0 | 0x87 | | $C_1$ | $C_2$ | $C_3$ | $C_4$ | $C_5$ | $C_6$ $C_7$ |
| $D_0T_1C_2C_3/C_4C_5C_6C_7$ | | 1 | 0 | 0x99 | $D_0$ | | $C_2$ | $C_3$ | $C_4$ | $C_5$ | $C_6$ $C_7$ |
| $D_0D_1T_2C_3/C_4C_5C_6C_7$ | | 1 | 0 | 0xaa | $D_0$ | $D_1$ | | $C_3$ | $C_4$ | $C_5$ | $C_6$ $C_7$ |
| $D_0D_1D_2T_3/C_4C_5C_6C_7$ | | 1 | 0 | 0xb4 | $D_0$ | $D_1$ | $D_2$ | | $C_4$ | $C_5$ | $C_6$ $C_7$ |
| $D_0D_1D_2D_3/T_4C_5C_6C_7$ | | 1 | 0 | 0xcc | $D_0$ | $D_1$ | $D_2$ | $D_3$ | | $C_5$ | $C_6$ $C_7$ |
| $D_0D_1D_2D_3/C_4T_5C_6C_7$ | | 1 | 0 | 0xd2 | $D_0$ | $D_1$ | $D_2$ | $D_3$ | $C_4$ | | $C_6$ $C_7$ |
| $D_0D_1D_2D_3/C_4C_5T_6C_7$ | | 1 | 0 | 0xe1 | $D_0$ | $D_1$ | $D_2$ | $D_3$ | $C_4$ | $C_5$ | $C_7$ |
| $D_0D_1D_2D_3/C_4C_5C_6T_7$ | | 1 | 0 | 0xff | $D_0$ | $D_1$ | $D_2$ | $D_3$ | $C_4$ | $C_5$ | $C_6$ |

FIG. 5A

| SYNC | Symbol-out₀ 0 ○○○ 7 | Symbol-out₁ 0 ○○○ 7 | Symbol-out₂ 0 ○○○ 7 | Symbol-out₃ 0 ○○○ 7 | Symbol-out₄ 0 ○○○ 7 | Symbol-out₅ 0 ○○○ 7 | Symbol-out₆ 0 ○○○ 7 | Symbol-out₇ 0 ○○○ 7 |
|---|---|---|---|---|---|---|---|---|
| 01 | Data₀ 0 ○○○ 7 | Data₁ 0 ○○○ 7 | Data₂ 0 ○○○ 7 | Data₃ 0 ○○○ 7 | Data₄ 0 ○○○ 7 | Data₅ 0 ○○○ 7 | Data₆ 0 ○○○ 7 | Data₇ 0 ○○○ 7 |

FIG. 5B

| SYNC | Symbol-out₀ 0 ○○○ 7 | Symbol-out₁ 0 ○○○ 7 | Symbol-out₂ 0 ○○○ 7 | Symbol-out₃ 0 ○○○ 7 | Symbol-out₄ 0 ○○○ 7 | Symbol-out₅ 0 ○○○ 7 | Symbol-out₆ 0 ○○○ 7 | Symbol-out₇ 0 ○○○ 7 |
|---|---|---|---|---|---|---|---|---|
| 10 | 0001 Ctrl 0 0○○○3 | 1001 Ctrl 1 0○○○3 | 0101 Ctrl 2 0○○○3 | 1101 Ctrl 3 0○○○3 | 0011 Ctrl 4 0○○○3 | 1011 Ctrl 5 0○○○3 | 0111 Ctrl 6 0○○○3 | 1110 Ctrl 7 0○○○3 |

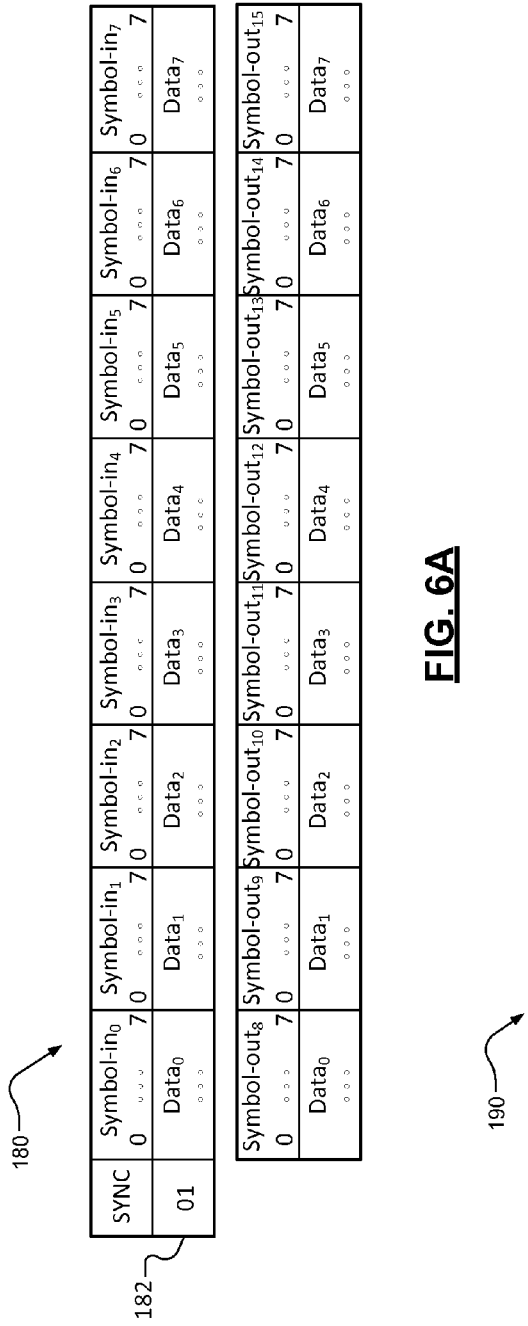
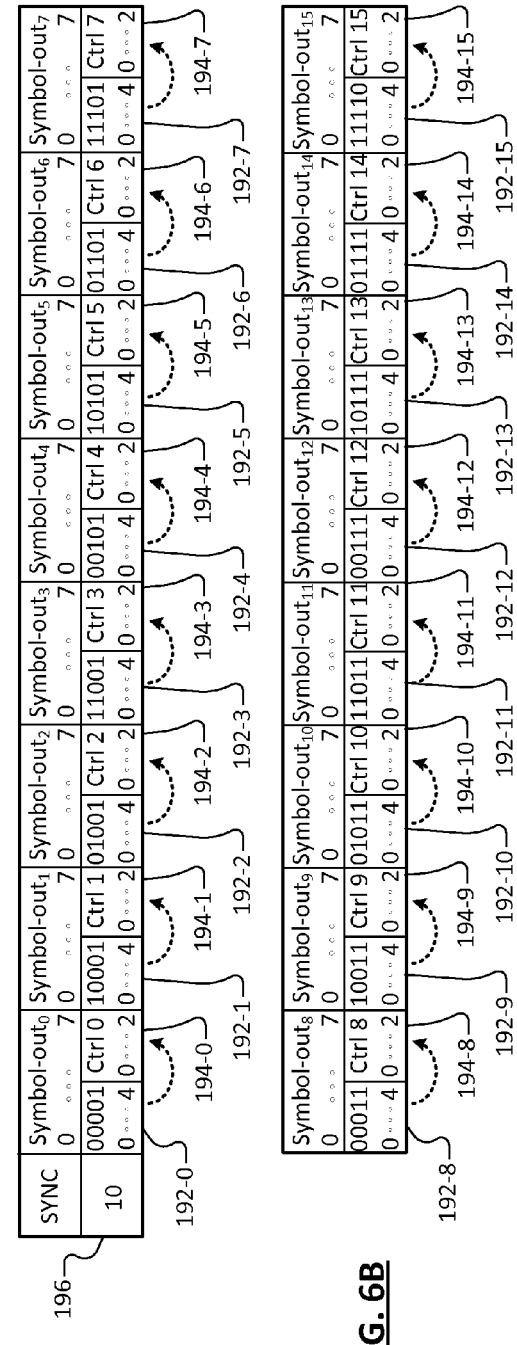
FIG. 6A
FIG. 6B

METHOD AND APPARATUS FOR AGGREGATING AND ENCODING RECEIVED SYMBOLS INCLUDING GENERATION OF A POINTER FOR A CONTROL CODE

CROSS-REFERENCE TO RELATED APPLICATIONS

This application claims the benefit of U.S. Provisional Application No. 61/943,272, filed on Feb. 21, 2014. The entire disclosure of this application referenced above is incorporated herein by reference.

FIELD

The present invention relates to networks, and more particularly to data coding in physical coding sublayers of physical layer devices in Ethernet network devices.

BACKGROUND

Ethernet network devices include physical layer devices that transmit and receive data over a medium. In a gigabit (Gb) network device, the physical layer device includes a physical coding sublayer (PCS), which acts as an interface between (i) a gigabit media independent interface (GMII) or an extended GMII (XGMII) and (ii) a physical medium attachment (PMA) layer.

The PCS typically includes an encoder and a decoder. The PCS may also include other components such as a scrambler and a gearbox. The gearbox is not necessary when an analog circuit in the PMA layer is designed to run based on (i) multiples of a reference clock, or (ii) multiples of a bus width. In essence, the gearbox is used as a digital solution to overcome analog circuit limitations. The encoder provides data formatting and organizes the data into bytes of data and control codes. Encoding performed by the encoder may be referred to as 64/66 bit encoding, where 64 bits are provided to the encoder and 66 bits are output from the encoder. The 66 bits include a 2-bit synchronization (SYNC) header. The scrambler performs line balancing and ensures sufficient transition density. This may include providing a relatively even distribution of 1s and 0s in an output of the scrambler. The function of the gearbox is application specific. The gearbox may include a buffer that is used to adjust for input and output speed differences of the gearbox. The gearbox may format data widths for a serializer/deserializer (SERDES). For example, the gearbox may convert the 66 bit signal to a 16 bit interface signal. The SERDES may then convert this 16 bit interface signal into a fully serial signal. The gearbox may combine the 2-bit sync header with the output of the scrambler.

A PCS may be implemented based on the 10GBASE-R standard described in Institute of Electrical and Electronics Engineers (IEEE) section 802.3, which is hereby incorporated herein by reference. The 10GBASE-R standard implements 64/66 bit encoding, which has low overhead. The 10GBASE-R standard restricts placement of control codes within an encoded block. This prevents encoding aggregated bytes of data and control codes, received from multiple independent communications channels, when the bytes of data and control codes are not received in a predetermined order. Bytes of data and control codes are received in a predetermined order when the control codes are in certain positions relative to the bytes of data. In other words, an encoder, designed according to the 10GBASE-R standard, may be unable to encode bytes of data and control codes that are received in an arbitrary or unknown order.

SUMMARY

A data processing system is provided and includes an interface and an encoder. The interface is configured to receive first symbols from one or more ports. The interface is configured to aggregate a predetermined number of the first symbols to provide second symbols. The encoder is configured to (i) generate a header, and (ii) encode the second symbols to generate third symbols, where the header indicates whether the third symbols include a set of control codes. Responsive to the third symbols including the set of control codes, the encoder is configured to generate a pointer for the set of control codes, where the pointer can assume more values than are in the set of control codes.

In other features, a method is provided and includes: receiving at an interface first symbols from one or more ports; aggregating a predetermined number of the first symbols to provide second symbols; generating a header; and encoding the second symbols to generate third symbols. The header indicates whether the third symbols include a set of control codes. The encoder is configured to, responsive to the third symbols including the set of control codes, generate a pointer for the set of control codes. The pointer has more bits than are in the set of control codes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 illustrates combinations of control codes and data bytes within encoded blocks using 64/66 bit encoding according to the prior art;

FIG. 5A illustrates an encoded block without control codes and having 8 symbols in accordance with the present disclosure;

FIG. 5B illustrates an encoded block without data symbols and includes 4-bit pointers in accordance with the present disclosure;

FIG. 6A illustrates an encoded block without control codes and having 16 data symbols in accordance with the present disclosure;

FIG. 6B illustrates an encoded block without data symbols and having 5-bit pointers in accordance with the present disclosure;

In the drawings, reference numbers may be reused to identify similar and/or identical elements.

DETAILED DESCRIPTION

Examples are disclosed below that permit aggregating encoding of data and control codes received in any arbitrary order. The data and control codes may be received on one or more independent communication channels and/or via one or more input ports.

Figure 1:
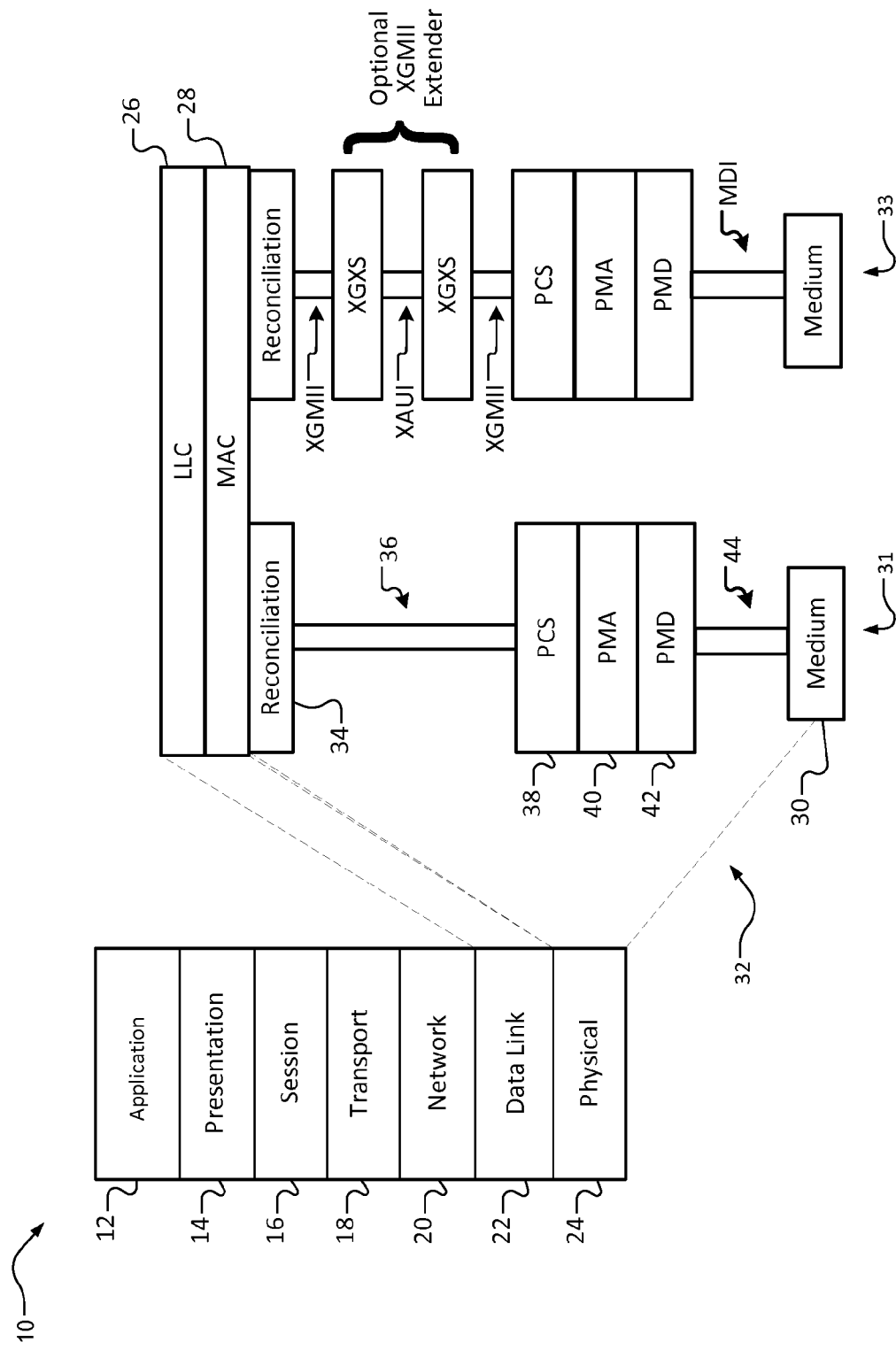
FIG. 1 illustrates an open systems interconnection (OSI) model and sub-layers of a data link layer and a physical layer in accordance with the present disclosure.

FIG. 1 shows an OSI model 10 including an application layer 12, a presentation layer 14, a session layer 16, a transport layer 18, a network layer 20, a data link layer 22 and a physical (PHY) layer 24. The physical layer 24 is configured in accordance with the present disclosure. The data link layer 22 and the physical layer 24 may include and/or be implemented respectively as a data link layer device and a physical layer device. The data link layer 22 may include a logical link control (LLC) layer and a medium access control (MAC) layer 28. The MAC layer may include and/or be implemented as a MAC device. One or more of the layers 12, 14, 16, 18, 20, 22, 24 may be implemented in a network device, such as a mobile device, a router, a computer, an appliance, etc.

The PHY layer 24 transmits data to and receives data from a medium 30. The PHY layer 24 includes a group of sublayer devices 32 and is shown as having two paths 31, 33. The second path 33 includes an optional XGMII extender. One of the paths 31, 33 may be used for receiving data and the other one of the two paths 31, 33 may be used for transmitting data. The group of sublayer devices 32 includes a reconciliation sublayer 34, an extended gigabit media independent interface (XGMII) 36, a physical coding sublayer (PCS) 38, a physical medium attachment (PMA) layer 40, a physical medium dependent (PMD) sublayer 42, and a medium dependent interface (MDI) 44. The reconciliation sublayer 34 may be a ten gigabit Ethernet sublayer. The PCS 38 encodes data received from and decodes data transferred to the XGMII 36. The PCS 38 transfers the encoded data to and receives the decoded data from the PMA 22. The PCS may operate at speeds such as 1 gigabit/second (1 Gb/s), 10 Gb/s (XGMII), 40 Gb/s (XLGMII), 100 Gb/s (CGMII), or other suitable speed. As an example, a PCS operating at the 1 Gb/s speed may transfer 10 bits per symbol, where 8 bits are data bits and 2 bits are control bits (e.g., an enable bit and an error bit). As another example, a PCS operating at the 10 Gb/s speed, may transfer 36 bits per symbol, where 32 bits are data bits and 4 bits are control bits. As yet another example, a PCS operating at the 40 Gb/s speed or the 100 Gb/s speed may transfer 68 bits per symbol, where 64 bits are data bits and 4 bits are control bits.

Although FIG. 1 illustrates the group of sublayer devices 32 for ten gigabit Ethernet applications, the group of sublayer devices 32 may be used and/or modified for other applications. For example, the XGMII 36 may be replaced with a GMII interface. As an example, the PCS 38 and the GMII may communicate with each other via 8-bit parallel data lines and several control lines. The PCS 38 is responsible for encoding each octet passed down via each data line from the GMII into 10-bit code groups. The PCS 38 is also responsible for decoding 10-bit code groups received from the PMA 40 and converted to octets for use by layers higher than the corresponding PHY layer. The PCS 38 may communicate with the GMII via a different number of parallel data lines and any number of control lines. Each data line and/or control line may transfer an octet per transfer event or a different number of bits (other than eight bits) per transfer event. For example and as shown below, the PCS 38 may transfer 16 bits or 32 bits of data per transfer event. The disclosed layers of FIG. 1 may be implemented as respective modules.

Figure 2:
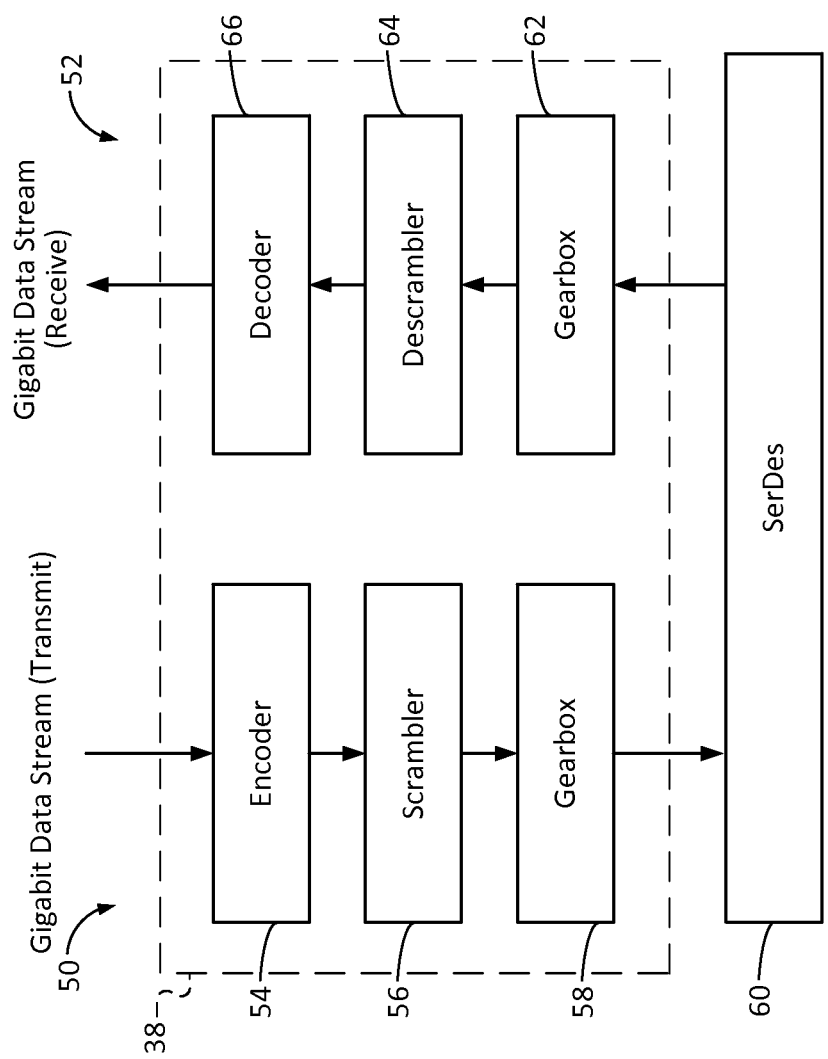
FIG. 2 is a functional block diagram of a transceiver devices of a PCS in accordance with the present disclosure.

FIG. 2 shows the PCS 38, which includes transmitter devices 50 (collectively referred to as a transmitter) and receiver devices 52 (collectively referred to as a receiver). The transmitter devices 50 include an encoder 54 (or encoding module), which assembles and encodes data and control codes to form encoded blocks for transmission in accordance with the present disclosure. The control codes may indicate: a start and/or an end of a packet and/or symbol; whether a symbol is an idle symbol; whether a symbol is associated with an error; whether a symbol is an enable symbol; and/or other control information. A symbol may include any number of bits. For example, a symbol may include 8, 10, 16, 32 or some other number of bits. The encoding performed by the encoder 54 may be referred to as B1/B2 bit encoding, where B1 bits are provided to the encoder 54 and B2 bits are output from the encoder 54. The B2 bits may include a S-bit synchronization (SYNC) header. As an example, B1 may be 64, B2 may be 66, and S may be 2. As another example, B1 may be 64, B2 may be 65, and S may be 1. B1, B2 and S may be integer values, where B1 is greater than 1, B2 is greater than B1, and S is greater than or equal to 1. As another example, B1 may be equal to 8·N and B2 may be equal to 8·N+S, where N is a number of bits in each symbol and S is an integer greater than or equal to 1.

The encoded blocks are transmitted from the encoder 54 to a scrambler 56 (or scrambling module). The scrambler 56 prepares the encoded blocks for transmission and ensures sufficient transition density. The scrambler 56 performs line balancing and ensures sufficient transition density. This may include providing a relatively even distribution of 1s and 0s as an output of the scrambler 56. An output of the scrambler 56 is transmitted to a gearbox 58 (or formatting module). The gearbox 58 formats data for a particular serializer/deserializer (SERDES) 60. The gearbox 58 may include a FIFO buffer, which is used to transition from a first data rate (or speed) to a second data rate (or speed) and/or to modify a width of a bit pattern. The function of the gearbox is application specific. The gearbox 58 may format data widths for the SERDES 60. For example, the gearbox 58 may convert the B2 bits into an interface signal including a predetermined number of bits (e.g., 16 bit) per transfer event. The SERDES 60 may then convert the interface signal into a fully serial signal. The gearbox 58 may combine the S-bit SYNC header with the output of the scrambler 56.

The receiver devices 52 may include a gearbox 62, a descrambler 64, and a decoder 66. The gearbox 62, descrambler 64 and decoder 66 perform opposite operations as the gearbox 58, scrambler 56, and encoder 54 such that the operations of the gearbox 58, scrambler 56, and encoder 54 are performed in a reverse order. For example, a received signal is deformated and/or deserialized, descrambled, and decoded by the gearbox 62, descrambler 64 and decoder 66.

For 8-bit to 10-bit encoding, each encoded block transmitted may have 256 (or $2^8$) bit combinations of data per symbol and a limited number of control codes, where each symbol has eight bits. A 2-bit SYNC header may indicate whether the encoded block includes only data or includes one or more control codes. In BASE-R type there are 15 predefined possible control code combinations. Examples of the control code combinations are shown in FIG. 3. The control code combinations are indicated by a first symbol of each encoded block, where each encoded block has eight symbols. Since there are 256+12=268 total combinations, 9 bits (8 data bits and 1 control bit) may be used to encode all valid data blocks. When 8-bit to 10-bit encoding is implemented, 10 bits (8 data bits and 2 control bits) are used instead of 9, which increases overhead. However, 10 bits are used to preserve direct current (DC) balance and to ensure that sufficient transitions exist through redundant bits.

For 8 data bits there are $2^8$ (or 256) possible bit combinations. If a control bit is added, there are $2^9$ (or 512) possible bit combinations. However to encode 8 symbols with 8 data bits and 1 control bit per symbol, 256+8 (1 control bit possibility for each symbol encoded) is needed. Likewise, to encode 16 symbols with 8 data bits and 1 control bit per symbol, 256+16 (1 control bit possibility for each symbol encoded) is needed. Thus, if 8 symbols are received with 8 data bits and 1 control bit per symbol, 72 bits are received. By using lossless compression, the 72 bits can be converted to 66 bits (64 encoded bits and 2 header bits) as disclosed below. If 16 symbols are received with 8 data bits and 1 control bit per symbol, 80 bits are received. By using lossless compression, the 80 bits can also be converted to 66 bits (64 encoded bits and 2 header bits) as disclosed below. A 64/66 bit block encoding may be implemented by a 10GBASE-R PCS of a system designed according to IEEE 802.3. 10GBASE-R reduces overhead and achieves DC balance through scrambling and periodic transitions.

The encoder 54, scrambler 56, gearbox 58, gearbox 62, descrambler 64 and decoder 66 may be implemented as any of the encoders, scramblers, gearboxes, descramblers, and decoders disclosed herein. Other encoders, scramblers, gearboxes, descramblers, and decoders are shown in FIGS. 4, 7, 8, and 10.

FIG. 3 shows traditional combinations of control codes and data bytes ($D_0$-$D_7$) within encoded blocks using 64/66 bit encoding for traditional 10GBASE-R according to IEEE 802.3, which is hereby incorporated by reference in its entirety. A 2-bit sync header 70 is followed by a 64-bit block 72 for each encoded block. Each 64-bit block 72 includes 8 bytes, where each byte may be a data byte (e.g., one of $D_0$-$D_7$) or a control code byte (e.g., one of $C_0$-$C_7$, $O_0$, $O_4$, $S_0$, $S_4$, $T_0$-$T_3$). A 2-bit SYNC header 60 with a value of '01' indicates that the corresponding 64-bit encoded block only includes data bytes. When the 2-bit SYNC header 60 has a value of '10', at least one control code exists in the corresponding 64-bit encoded block.

FIG. 3 shows that there are a limited number of permutations for the control codes and data bytes that can be received. Many combinations are not possible for a traditional PCS. For example, the combination $C_0,D_1,C_2,C_3,D_4,C_5,D_6,C_7$ is not possible. This limitation creates a problem when bytes (or symbols) of data and control codes are arbitrarily received, such that the control codes may be located within any received byte (or symbol). For example, when multiple independent streams of data and control codes are aggregated into a high-speed link, the control codes may be arbitrarily placed among the data bytes (or symbols). Aggregation is very useful in reducing pin counts of devices. Therefore, a traditional 10GBASE-R PCS cannot be used as designed when multiple independent data streams need to be aggregated, as described above.

Figure 4:
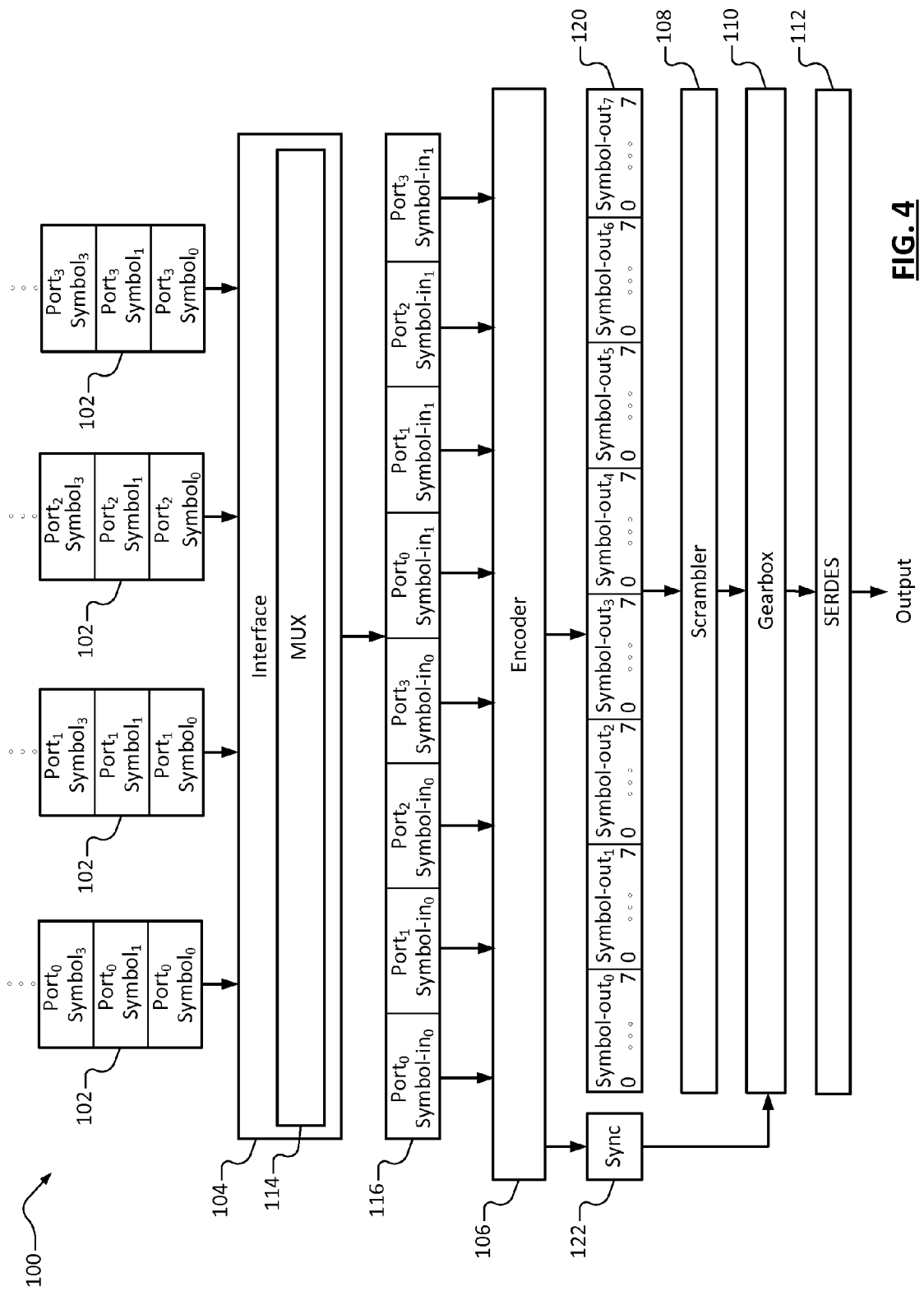
FIG. 4 is a functional block diagram of a data processing system within a PCS including an encoder in accordance with the present disclosure.

FIG. 4 shows a data processing system 100 within a PCS (e.g., the PCS 38 of FIGS. 1-2). The data processing system 100 is configured for transmission and includes input ports 102, an interface 104 (e.g., GMI interface), an encoder 106, a scrambler 108, a gearbox 110, and a SERDES 112. The input ports 102 receive symbols including data symbols (include only data), control code symbols (include only control codes), and/or combination symbols (include data and control codes) via respective channels. A "control code", as used herein, refers to a control bit that is used to indicate control information.

As shown, four independent streams of symbols are received from the ports 102 at the interface 104. The interface 104 may include a multiplexer 114 that combines a predetermined number of received symbols and/or portions thereof to form a non-encoded block 116. Symbols received from the ports 102 may be interleaved when aggregated to provide the non-encoded block 116 such that the non-encoded block 116 includes one or more symbols from each of the ports 102. The non-encoded block 116 include symbols (e.g., symbols Symbol-in$_0$ and Symbol-in$_1$ for the first and second ports are shown for a first non-encoded block). The order in which the interface 104 outputs symbols may be based on the order in which the interface receives symbols. In other words, the interface 104 may convert first symbols received from the ports 102 to the symbols Symbol-in$_{0, 1, \ldots}$ in the order in which the interface 104 receives the first symbols from the ports 102.

The symbols received at the ports 102 may be larger than the symbols output from the interface 104. If this is the case, the interface 104 performs compression. For example, the received symbols may each include data bits (e.g., 8 data bits) and control code bits (2 control code bits) such that each of the received symbols has 10 bits. The control code bits may include, for example, a TXEN bit and a TXER bit. The TXEN bit is a transmit enable bit and the TXER bit is a transmit error bit. The symbols out of the interface 104 may each have 8 bits. In the example shown, symbols generated by the encoder 106 as a result of receiving the non-encoded block 116 are shown as Symbol-out$_{0-7}$, which are as part of an encoded block 120.

The encoder 106 generates a SYNC header 122 and pointers based the control code bits in the symbols received by the interface 104. The SYNC header 122 indicates if encoded blocks out of the encoder 106 include only data symbols or include one or more control code symbols. The SYNC header 122 may include one or more bits. As a first example, the SYNC header 122 may include two bits, where a '01' indicates only data symbols are included in the encoded block and a '10' indicates at least one control code (or at least one set of control codes) is included in the encoded block. As another example, the SYNC header 122 may include only a single bit, where a '0' indicates only data symbols are included in the encoded block and a '1' indicates at least one control code (or at least one set of control codes) is included in the encoded block. The pointers point to respective sets of control codes.

In the example shown, each symbol out of the encoder 106 may have 8 bits. Each of the pointers includes 4 bits. Each of the sets of control codes includes 4 control codes (or 4 control bits). As a result, the symbols may have $2^8$ different bit combinations. The symbols may include $2^4$ different control code combinations. Each of the encoded blocks may have $2^3$ symbols. Other symbol sizes, pointer sizes, numbers of control codes per symbol are described below.

The encoded block 120 is transmitted to the scrambler 108. The SYNC header 122 is used by a receiver to lock onto a data block. The encoder 106 bypasses the scrambler and forwards the SYNC header 122 to the gearbox 110. Both a scrambled block and the SYNC header 122 are input to the gearbox 110. Data from the gearbox 110 is transmitted to a SERDES 112. The scrambler 108 and the gearbox 110 may operate according to the 10GBASE-R standard. However, the encoding implemented by the encoder 106 is different than the encoding performed by traditional 10GBASE-R devices.

FIGS. 5A-5E, show examples of encoded blocks out of the encoder 106 of FIG. 4. As stated above and for the example shown, each symbol out of the encoder 106 may have 8 bits, each of the pointers includes 4 bits, and each set of control codes includes 4 control codes. As a result, each of the symbols has 1 of 256 bit combinations and each of the sets of control codes has 1 of 16 bit combinations. In each of FIGS. 5A-5E, two-row tables are provided. The first rows of the tables indicate items that are in the respective column entries of the second row. The second rows include respective SYNC headers and corresponding encoded blocks. As shown each of the encoded blocks includes eight symbols. Each of the symbols may have 8 bits as shown or a different number of bits. The bits are ordered with the least significant bit first.

FIG. 5A shows an encoded block 130 having 8 symbols. In the example of FIG. 5A, the encoded block 130 only has data as indicated by the SYNC header 132. Thus, the encoded block 130 includes data symbols $DATA_{0-7}$. FIG. 5B shows an encoded block 140 without data symbols and includes 4-bit pointers 142. The encoded block 140 has a corresponding SYNC header 144 that indicates that there is at least one control code and/or at least one control code symbol in the encoded block 140. Each of the 4-bit pointers is followed by a corresponding 4-bit set of control codes 146. The encoded block 140 only includes pointers and sets of control codes. The encoded block 140 does not include any data symbols. The pointer bits are bits 0-3 of the symbols of the encoded block 140. The control code bits are bits 4-7 of the symbols of the encoded block 140. The pointers 142 point to locations of corresponding sets of control codes 146.

Bits 0-2 of each of the pointers 142 indicate a location of the next corresponding set of control codes in the encoded block 140. Bit 3 of each of the pointers 142 indicates whether there is an additional control code (or set of control codes) following the control code (or set of control codes) to which that pointer is pointing. Each of the pointers identifies a control code or set of control codes and/or a location of the next control code or set of control codes in the encoded block 140.

Bits 0-2 of each of the pointers 142 have a binary value from 0 to 7 that corresponds to a symbol where the corresponding control code (or set of control codes) is located. For example, bits 0-2 of the pointer 142-0 in symbol-out$_0$ are '000' indicating the corresponding set of control codes is located in the symbol-out$_0$. Bits 0-2 of the pointer 142-1 in symbol 1 are '001' indicating the next control code (or set of control codes) is located in symbol-out$_1$. Bit 3 of the pointer 142-0 in symbol 0 is '1', which indicates that there is another control code following the control code that the pointer 142-0 is pointing. Bit 3 of the pointer 142-7 in symbol 7 is '0', which indicates that there are no more control codes after the control code of the pointer 142-7. Bit 3 of a pointer 142-7 in symbol 7 may also be set to 0 since symbol 7 is the last symbol of the encoded block 140.

Figure 5C:
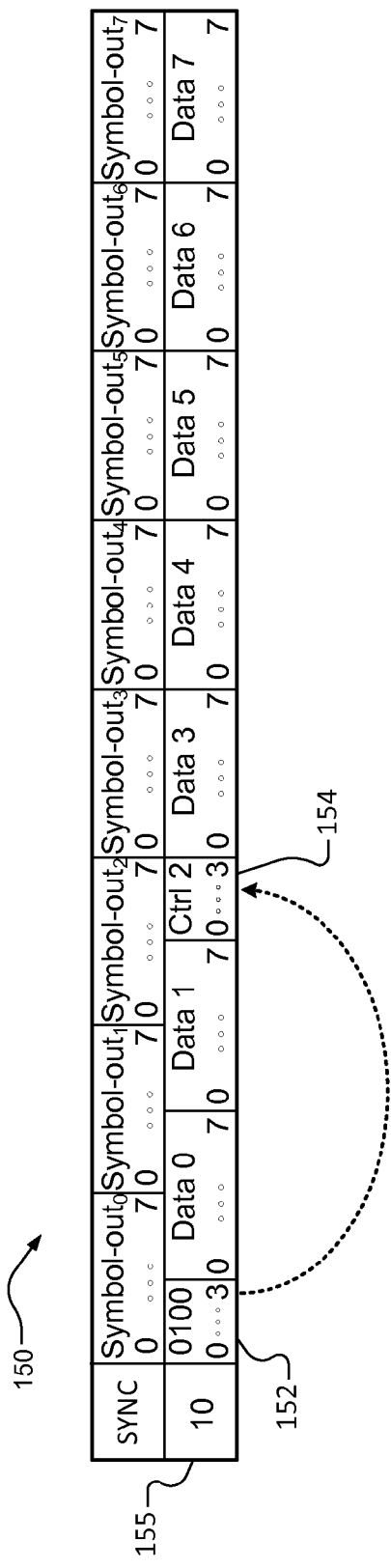
FIG. 5C illustrates an encoded block including a control code, a 4-bit pointer, and some shifted data symbols in accordance with the present disclosure.

FIG. 5C shows an encoded block 150 including a 4-bit pointer 152, a set of control codes 154 (which may collectively be referred to as a control code), and some shifted data symbols $Data_{0-7}$. The encoded block 150 has a corresponding SYNC header 155. Bits 0-2 of the pointer 152 in symbol-out$_0$ are '010', which indicate that a next control code is located in symbol-out$_2$. Bit 3 of the pointer 152 in symbol-out$_0$ is '0', which indicates that the control code 154 is the final control code in the encoded block 150.

Figure 5D:
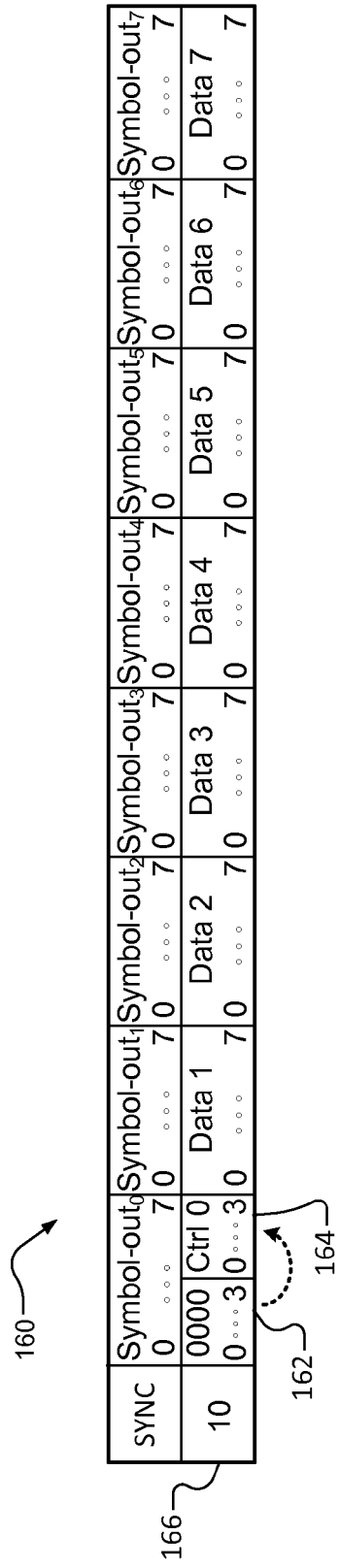
FIG. 5D illustrates an encoded block including a 4-bit pointer and a control code followed by data symbols in accordance with the present disclosure.

FIG. 5D shows an encoded block 160 including a 4-bit pointer 162, a control code 164 and data symbols$_{1-7}$. The encoded block 160 has corresponding SYNC header 166. All of the data symbols$_{1-7}$ are located within corresponding symbol position boundaries of the encoded block. This is because the only control code occurs in symbol-out$_0$. This is unlike data symbols shown in FIG. 5E, where some of the data symbols are shifted to be partially located within boundaries of two adjacent symbol positions. Bits 0-2 of the pointer 152-0 in symbol-out$_0$ are '000', which indicates that a corresponding control code is located in symbol-out$_0$ (94-0). Bit 3 of the pointer 152-0 in symbol-out$_0$ is '0', which indicates that the next control code is the last control code of the encoded block 150.

Figure 5E:
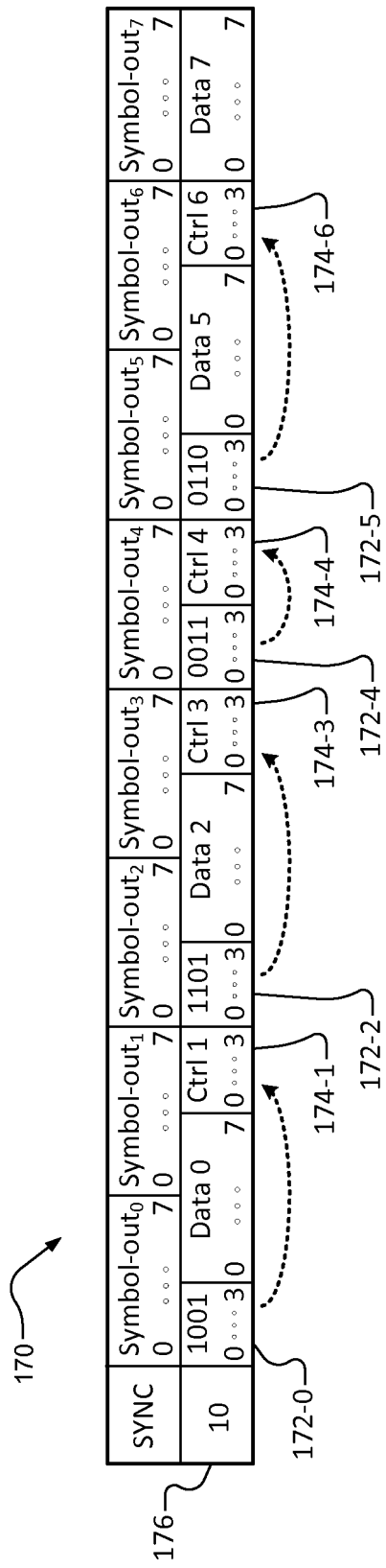
FIG. 5E illustrates an encoded block including control codes, 4-bit pointers and some shifted data symbols in accordance with the present disclosure.

FIG. 5E shows an encoded block 170 that includes 4-bit pointers 172, sets of control codes 174 and some shifted data symbols $Data_0$, $Data_2$, and $Data_5$. The encoded block 170 has a corresponding SYNC header 176. Data symbols $Data_0$, $Data_2$, and $Data_5$, due to prior adjacent pointers and subsequent adjacent sets of control codes, are each located within multiple symbol positions. For example, the data symbol $Data_0$ is partially located in the first symbol position Symbol-out$_0$ and partially located in the second symbol position Symbol-out$_1$. Thus, the data symbol $Data_0$ overlaps a boundary between the first symbol position Symbol-out$_0$ and the second symbol position Symbol-out$_1$. In FIGS. 5C and 5E, the data symbols that occur prior to a final control code are shifted 4 bits (or 1 nibble) to the right. The data symbols that occur after the final control codes are in respective symbol positions of the encoded blocks 150, 170 and thus are aligned with corresponding boundaries of the symbol positions. This is because there is a pointer subsequent and adjacent to each set of control codes that is succeeded by a data symbol or another set of control codes.

Bits 0-2 of the pointer 172-0 in symbol-out$_0$ are '100', which indicate that the next control code is located in symbol-out$_1$. Bit 3 of the pointer 172-0 in symbol-out$_0$ is 1, which indicates that the next control code is not the last control code of the encoded block 170. A pointer is located after each control code that is not a last control code of the encoded block 170. For example, the pointer 172-2 follows the control code 174-1 and the pointer 172-4 follows the control code 174-3. Bits 0-2 of the pointers 172 indicate an absolute symbol boundary value and do not indicate an offset. For this reason, the pointers 172 point in one direction.

The encoded blocks disclosed herein may be a series of link lists. Data symbols and control codes can appear in a variety of locations within encoded blocks. There are 2 possible locations for a data symbol to be located relative to boundaries of a symbol position in an encoded block. Data symbols that are located before a last control code are shifted a half of a symbol (e.g., 1 nibble) to the right. Data symbols that are located after a last control code are aligned with corresponding boundaries of symbol positions of the encoded block. Therefore, a 2-to-1 multiplexer may be used for corresponding hardware to detect where a data symbol is located within boundaries of a symbol position of an encoded block. The disclosed examples improve an encoding phase of a PCS to allow for arbitrary control code placement, while using B1/B2 bit encoding.

Figure 6C:
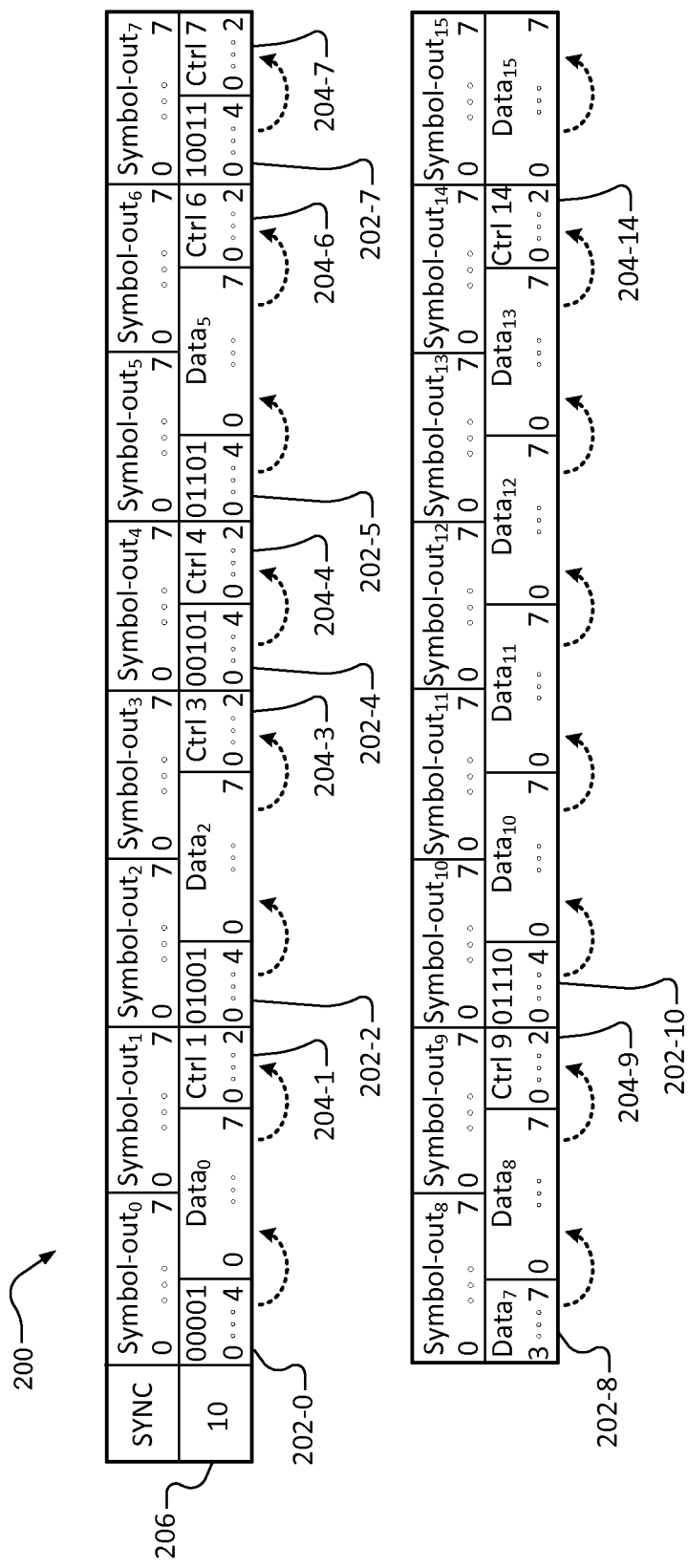
FIG. 6C illustrates another encoded block with control codes, 5-bit pointers and some shifted data symbols in accordance with the present disclosure.
Figure 7:
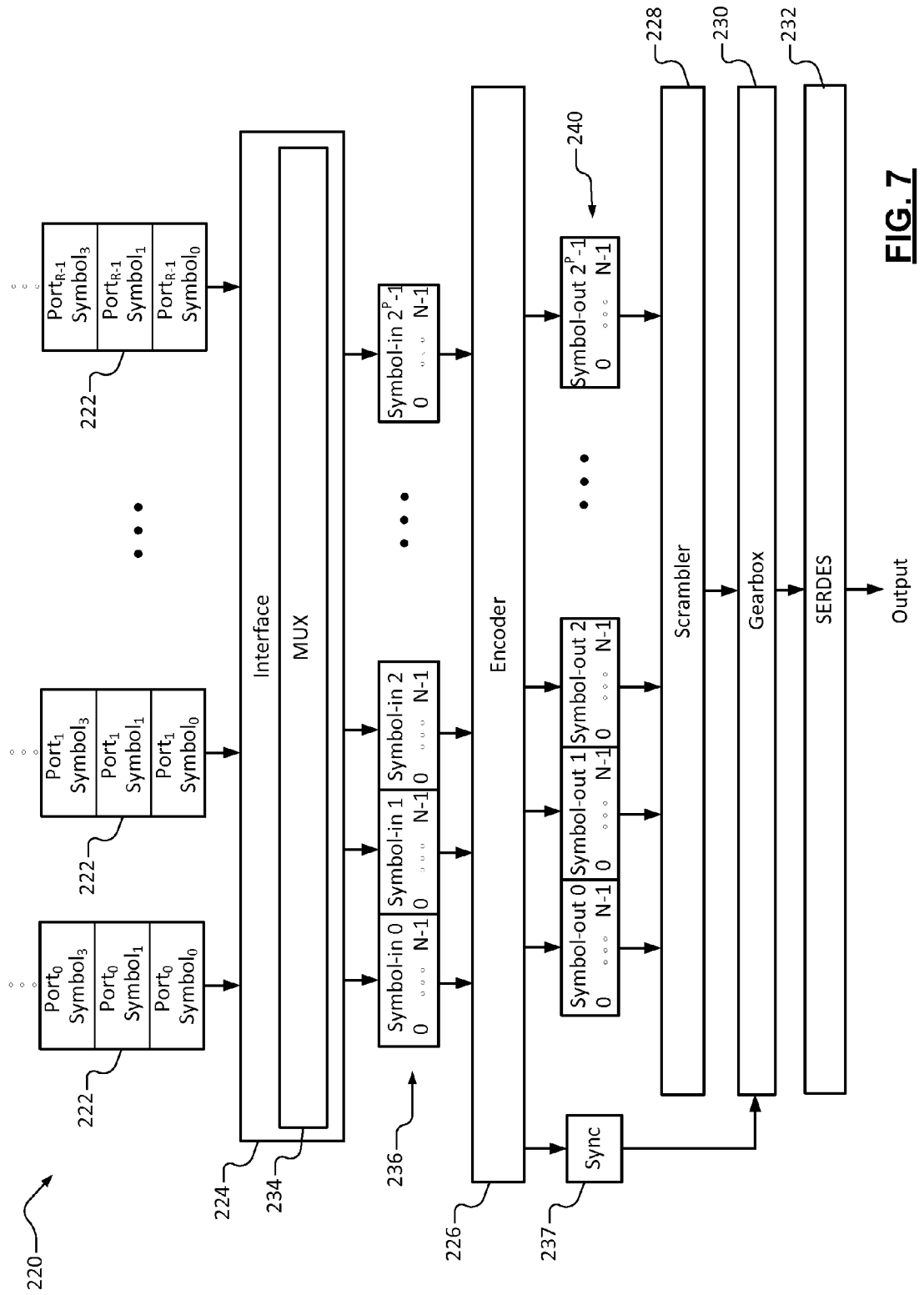
FIG. 7 a functional block diagram of another data processing system within a PCS including multiple input ports and an encoder in accordance with the present disclosure.

The following FIGS. 6A-6C show encoded blocks that may be generated by the encoder 106 of FIG. 4 or by the encoder 226 shown in FIG. 7. FIG. 6A shows an encoded block 180 without control codes and having 16 data symbols $Data_{0-15}$. As stated above, the encoder 106 of FIG. 4 may receive and output various numbers of symbols. In this example, the encoder 106 is providing as an output 16 data symbols $Data_{0-15}$ and a SYNC header 182. The encoded block 180 only includes data symbols, as indicated by the SYNC header 182.

FIG. 6B shows an encoded block 190 without data symbols and having 5-bit pointers 192 and sets of control codes 194. Each of the pointers include 5 bits; 4 pointer bits and 1 bit to indicate whether a next set of control codes is a last set of control codes. This accounts for having 16 symbols in the encoded block 190. Each of the sets of control codes 194 has 3 bits instead of 4 bits. The encoded block 190 has a corresponding SYNC header 196. FIG. 6C shows another encoded block 200 with 5-bit pointers 202, sets of control codes 204, and some shifted data symbols $Data_0$, $Data_2$, $Data_5$, $Data_8$, $Data_{10-14}$. The encoded block 200 has a corresponding SYNC header 206.

FIG. 7 shows another data processing system 220 within a PCS (e.g., the PCS 38 of FIGS. 1-2). The data processing system 220 includes input ports 222, an interface 224 (e.g., GMI interface), an encoder 226, a scrambler 228, a gearbox 230, and a SERDES 232. The input ports 222 receive symbols including data symbols, control code symbols, and/or combination symbols via respective channels. As shown, independent streams of symbols are received from the ports 222 at the interface 224. Any number of the ports 222 may be included. As shown $ports_{0 \ to \ R-1}$ are shown, where R is an integer greater than or equal to 1. As an example, R may be 8, 16, or 32.

Figure 8:
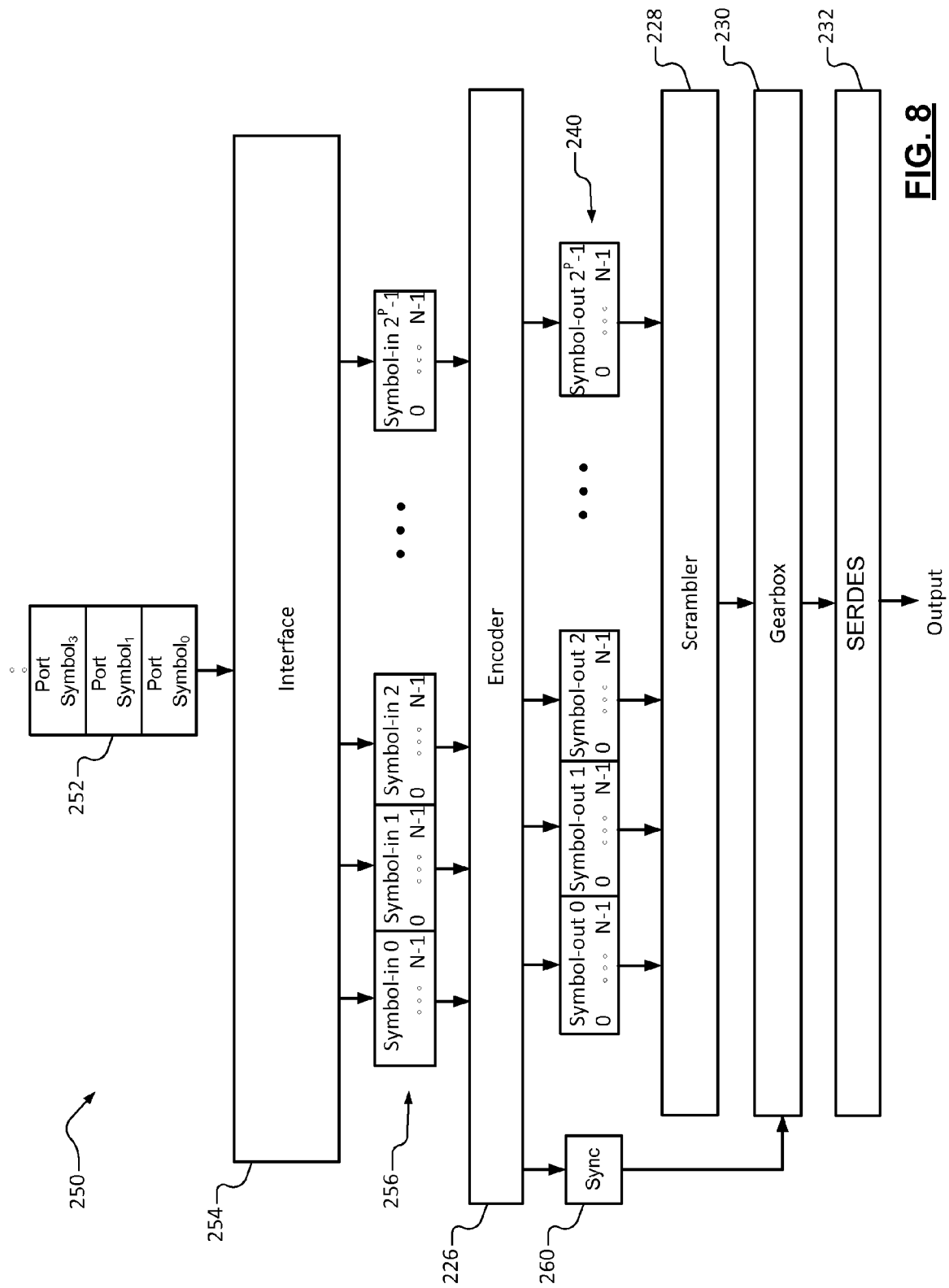
FIG. 8 a functional block diagram of another data processing system within a PCS including a single input port and an encoder in accordance with the present disclosure
Figure 10:
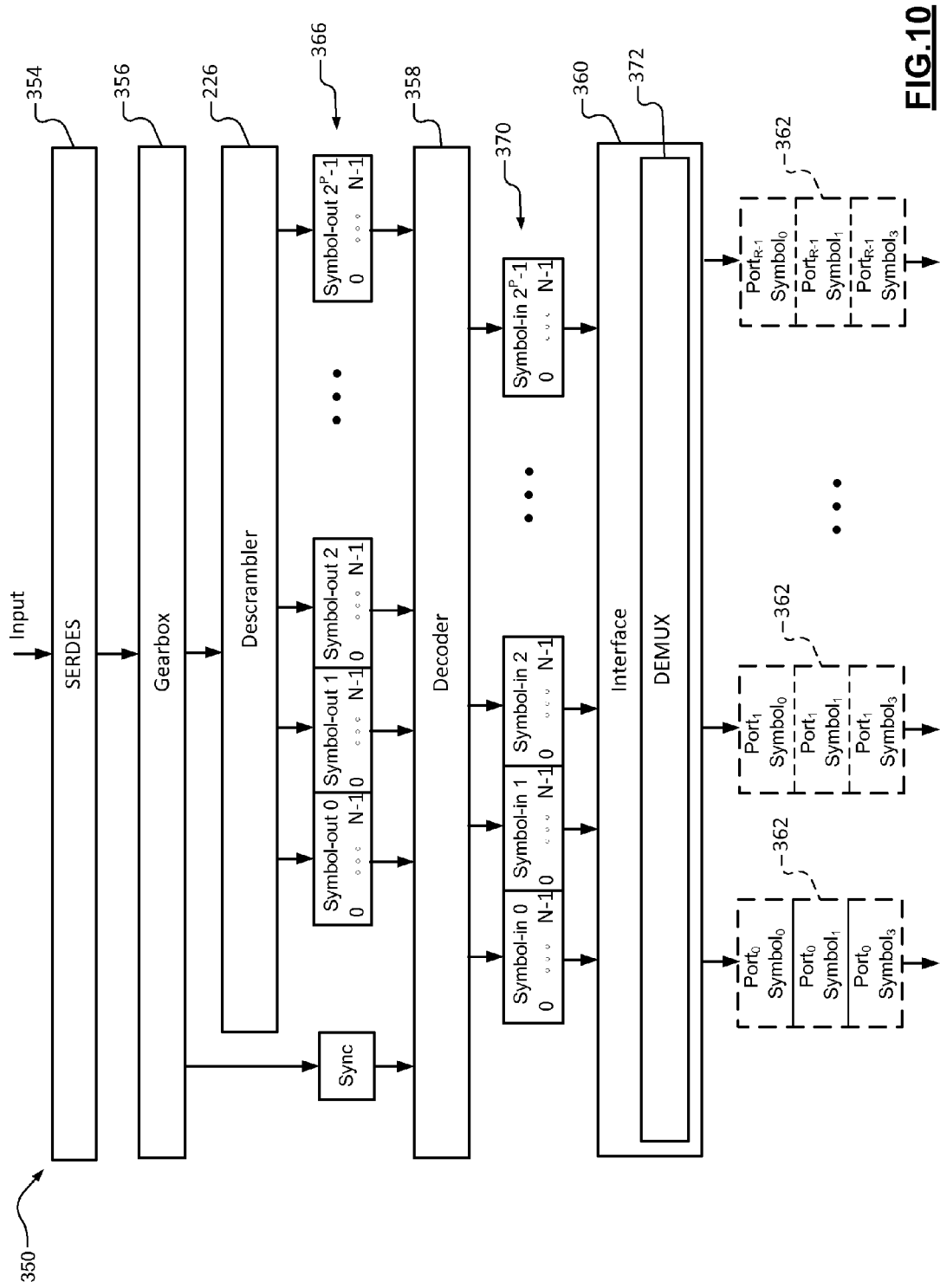
FIG. 10 illustrates a data processing system within a PCS including a decoder in accordance with the present disclosure.

The interface 224 may include a multiplexer 234 that combines a predetermined number of received symbols and/or portions thereof to form a non-encoded block 236. The predetermined number of received symbols may be different than the number of independent streams of symbols. The non-encoded block 236 includes input symbols. The input symbols include (i) symbols Symbol-in $0$-$2^P$-$1$ if P does not include the bit that indicates whether the symbol is a last control symbol, or (ii) symbols Symbol-in $0$-$2^{(P-1)}$-$1$ if P includes the bit that indicates whether the symbol is a last control symbol. The variable P is an integer indicating the number of pointer bits. However, the number of symbols may be up to $2^P$ as shown in FIGS. 7, 8 and 10. The input symbols of each of the non-encoded blocks 236 may include, for example, a predetermined number of symbols from each of the ports 222. For example, if the number of ports 222 is 8 and the number of input symbols per non-encoded block is 16, then each non-encoded block may have 2, 4, 8, or 16 input symbols from each of the ports 222. The number of input symbols from each of the ports 222 per non-encoded block may be equal to or different than the number of ports 222.

The number of input symbols in a non-encoded block as received by the encoder 226 may not be divisible by the number of ports. As another example, the non-encoded block may include 10 input symbols. If the number of bits per input symbol is 8, then the encoder 226 may receive 80 bits and may output 80+C bits, where C is a number of control bits in a SYNC header 237.

The symbols received at the ports 222 may be larger than the symbols output from the interface 224. If this is the case, the interface 224 performs compression. For example, the received symbols may each include data bits (e.g., 8 data bits) and control code bits (2 control code bits) such that each of the received symbols has 10 bits. The control code bits may include, for example, a TXEN bit and a TXER bit. The symbols out of the interface 224 may each have N bits, where N is an integer greater than or equal to 1. In the example shown, symbols generated by the encoder 226, as a result of receiving the non-encoded block 236, are shown as Symbol-out $0$-$2^P$ and as part of an encoded block 240, where P is a number of bits in each of the pointers of the encoded block 240.

The encoder 226 may generate the SYNC header 237 and the pointers based on control code bits in the symbols received by the interface 224. The SYNC header 237 indicates if encoded blocks out of the encoder 226 include only data symbols or include one or more control code symbols. The SYNC header 237 may include one or more bits. The pointers point to respective sets of control codes. Each of the pointers may include P bits, where P is an integer greater than or equal to 1. Each set of control codes may include C control codes (or C control bits), where C is an integer greater than or equal to 1 and where a sum of P and C is less than or equal to N. As an example, each symbol out of the encoder 226 may have N bits. As a result, the symbols may have $2^N$ different bit combinations. The symbols may include $2^C$ different control code combinations. Each of the encoded blocks may have less than or equal to $2^P$ symbols.

In the example shown, each symbol out of the encoder 226 may have N bits. If N=8, then each of the pointers may include 5 bits and each of the sets of control codes may include 3 control codes (or 3 control bits). The $5^{th}$ bit of the pointers may indicate whether the next set of control codes is a last set of control codes. As a result, the symbols of the encoded block 240 may each have up to $2^8$ different bit combinations. The symbols of the encoded block 240 may include $2^3$ different control code combinations.

The encoded block 240 is transmitted to the scrambler 228. The SYNC header 237 is used by a receiver to lock onto an encoded block. The encoder 226 bypasses the scrambler 228 and forwards the SYNC header 237 to the gearbox 230. Both a scrambled block and the SYNC header 237 are input to the gearbox 230. An output from the gearbox 230 is transmitted to the SERDES 232. The scrambler 228 and the gearbox 230 may operate according to the 10GBASE-R standard. However, the encoding implemented by the encoder 226 is different than the encoding performed by traditional 10GBASE-R devices.

FIG. 8 shows another data processing system 250 within a PCS (e.g., the PCS 38 of FIGS. 1-2). The data processing system 250 includes a single input port 252, an interface 254 (e.g., GMI interface), the encoder 226, the scrambler 228, the gearbox 230, and the SERDES 232. The input port 252 receives symbols including data symbols, control code symbols, and/or combination symbols via respective channels. As shown, a single stream of symbols is received from the port 252 at the interface 254. There are not any constraints on where a start of a packet (or start control code) occurs in the stream of symbols. As an example, the stream of symbols may be received from a MAC layer operating at 1000 megabits per second. The interface 254 does not include a multiplexer. The interface 254 combines a predetermined number of received symbols from the port 252 and/or portions thereof to form a non-encoded block 256. The non-encoded block 236 includes input symbols (e.g., symbols Symbol-in $0\text{-}2^P$).

Any number of input symbols as received by the encoder 226 may be included in a non-encoded block. As another example, the non-encoded block 236 may include 10 input symbols. If the number of bits per input symbol is 8, then the encoder 226 may receive 80 bits and may output 80+C bits, where C is a number of control bits in a SYNC header 237.

The symbols received at the port 252 may be larger than the symbols output from the interface 254. If this is the case, the interface 254 performs compression. The symbols out of the interface 254 may each have N bits, where N is an integer greater than or equal to 1. In the example shown, symbols generated by the encoder 226 as a result of receiving the non-encoded block 256 are shown as Symbol-out $0\text{-}2^P$ and as part of an encoded block 258, where P is a number of bits in each of the pointers of the encoded block 258.

The encoder 226 generates a SYNC header 260 and the pointers based on control code bits in the symbols received by the interface 254. The SYNC header 260 indicates if encoded blocks out of the encoder 226 include only data symbols or include one or more control code symbols. The SYNC header 260 may include one or more bits. The pointers point to respective sets of control codes. Each of the pointers may include P bits, where P is an integer greater than or equal to 1. Each set of control codes may include C control codes (or C control bits), where C is an integer greater than or equal to 1 and where a sum of P and C is less than or equal to N. As an example, each symbol out of the encoder 226 may have N bits. As a result, the symbols may have $2^N$ different bit combinations. The symbols may include $2^C$ different control code combinations. Each of the encoded blocks may have less than or equal to $2^P$ symbols.

In the example shown, each symbol out of the encoder 226 may have N bits. If N=8, then each of the pointers may include 5 bits and each of the sets of control codes may include 3 control codes (or 3 control bits). As a result, the symbols of the encoded block 258 may each have up to $2^8$ different bit combinations. The symbols of the encoded block 258 may include $2^3$ different control code combinations.

The encoded block 258 is transmitted to the scrambler 228. The SYNC header 260 is used by a receiver to lock onto an encoded block. The encoder 226 bypasses the scrambler 228 and forwards the SYNC header 260 to the gearbox 230. Both a scrambled block and the SYNC header 260 are input to the gearbox 230. An output from the gearbox 230 is transmitted to the SERDES 232.

Figure 9:
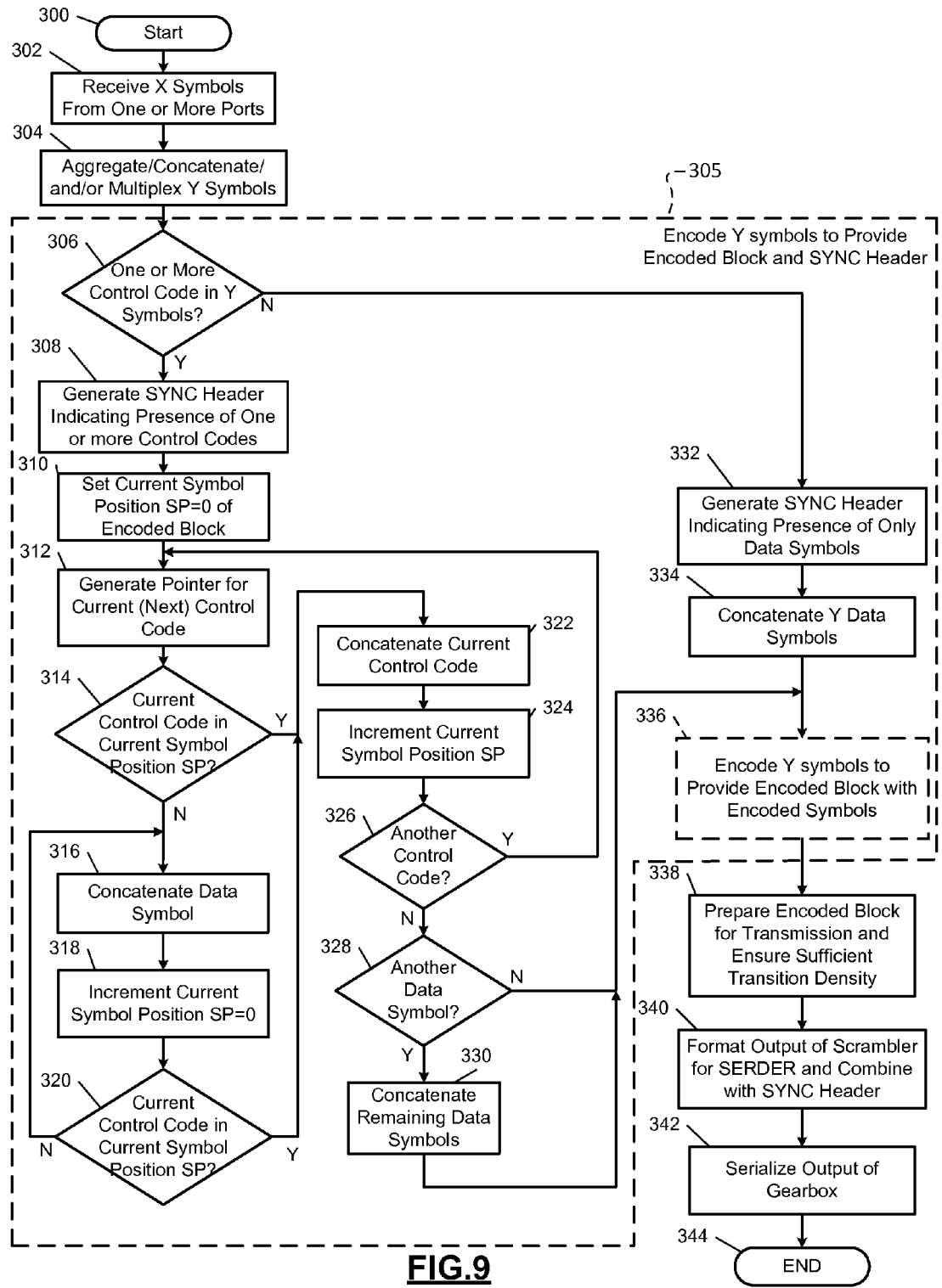
FIG. 9 illustrates a data processing method including encoding in accordance with the present disclosure.
Figure 11:
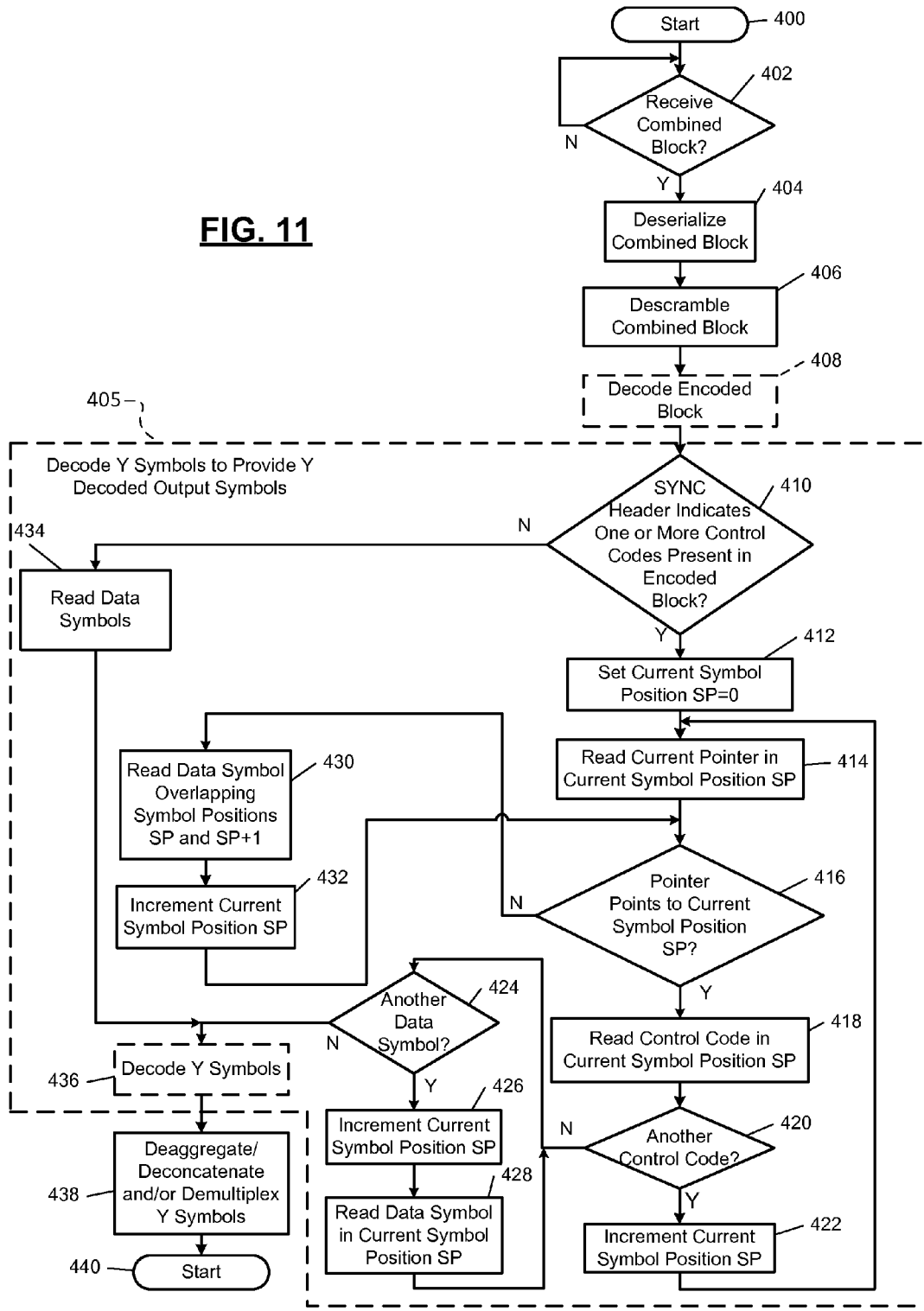
FIG. 11 illustrates another data processing method including decoding in accordance with the present disclosure.

The data processing systems, encoders, and decoders disclosed herein may be operated using numerous methods, example methods are illustrated in FIGS. 9 and 11. In FIG. 9, a data processing method including encoding is shown. Although the following tasks are primarily described with respect to the implementations of FIGS. 1-2 and 4-8, the tasks may be easily modified to apply to other implementations of the present disclosure. The tasks may be iteratively performed. For example, the tasks may be repeated for each encoded block generated.

The method may begin at 300. At 302, X symbols are received at an interface (e.g., one of the interfaces 104, 224, 254) via one or more ports (e.g., one or more of the ports 102, 222, 252), where X is an integer greater than 1. At 304, the interface aggregates, concatenates, and/or multiplexes Y symbols, where Y is an integer greater than 1.

The following tasks 306-336 may be performed by an encoder (e.g., one of the encoders 106, 226). The encoder encodes the Y symbols to provide an encoded block and a SYNC header. The encoding of the Y symbols is designated by dashed box 305 and may include the tasks 306-336.

At 306, the encoder determines whether one or more control codes (or one or more sets of control codes) are included in the Y symbols. If there is one or more control codes, task 308 is performed, otherwise task 332 is performed. At 308, the SYNC header is generated to indicate presence of one or more control codes. At 310, a current symbol position SP for an encoded block to be generated is set to 0.

At 312, the encoder generates a pointer for a current (or next) control code. At 314, the encoder determines whether the current control code is to be located in the current symbol position SP. If the current control code is not to be located in the current symbol position SP, then task 316 is performed, otherwise task 322 is performed.

At 316, a data symbol (or a next data symbol) is concatenated to the last pointer or control code. At 318, the current symbol position SP is incremented. At 320, the encoder determines whether the current control code is to be in the current symbol position SP. If the current control code is to be in the current symbol position SP, then task 322 is performed, otherwise task 316 is performed.

At 322, the current control code is concatenated to the last data symbol, or to the last pointer. At 324, the current symbol position SP is incremented. At 326, the encoder determines whether there is another control code (or set of control codes) to be added to the encoded block. If there is not another control code, task 328 is performed, otherwise task 336 may be performed. At 328, the encoder determines whether there is another data symbol to be added to the encoded block. If there is another data symbol, task 330 is performed, otherwise task 336 may be performed. At 330, remaining data symbols may be concatenated to the last data symbol or the last control code of the encoded block.

At 332, the encoder generates a SYNC header indicating that the encoded block only includes data symbols and not control codes. At 334, Y data symbols, which may be encoded are concatenated. The results of performing tasks 308-330 or tasks 332-334 provide Y concatenated symbols. Task 336 is provided for example purposes only and may not be performed. At 336, the Y concatenated symbols may be encoded to provide the encoded block. In addition or as an alternative, encoding may be performed prior to the concatenation performed during tasks 308-330 or tasks 332-334 or while generating the data symbols from the Y symbols provided at 304. As a result, the disclosed encoding may include one or more levels of encoding. The results of tasks 308-330, tasks 332-334 and/or task 336 provide an encoded block having Y encoded symbols.

At 338, a scrambler (e.g., one of the scramblers 108, 228) prepares the encoded block for transmission and ensures sufficient transition density. At 340, an output of the scrambler is formatted for a SERDES (e.g., one of the SERDES devices 112, 232) and is combined with the SYNC header to form a combined block. The SERDES serializes the combined block for transmission.

FIG. 10 illustrates a data processing system 350 within a PCS (e.g., the PCS 38 of FIGS. 1 and 2). The data processing system 350 includes a SERDES 352, a gearbox 354, a descrambler 356, a decoder 358, an interface 360 (e.g., GMI interface) and ports 362. The gearbox 354, the descrambler 356, the decoder 358 and the interface 360 may perform the opposite operations as the gearbox 110, 224 or 254, the scrambler 108, 228, the encoder 106, 226 of FIGS. 4, 7, 8.

The SERDES 352 deserializes a received serial signal. The gearbox 354 deformats and/or deserializes an output of the SERDES 352. The gearbox outputs a SYNC header 364 to the decoder 358. The descrambler 356 descrambles an output of the gearbox 354 to output symbols Symbol-out $0$-$2^P$ of an encoded block 366. Symbols Symbol-out $0$-$2^P$ refer to symbols previously generated by an encoder. The decoder 358 decodes the encoded block 366 based on the SYNC header 364 to output a non-encoded block 370 having the symbols Symbol-in $0$-$2^P$. Symbols Symbol-in $0$-$2^P$ refer to symbols previously received and encoded by the encoder.

The interface 360 may include a demultiplexer 372 that demultiplexes the non-encoded block 370 of symbols to provide one or more streams of symbols respectively for one or more of the ports 362.

FIG. 11 shows a data processing method including decoding. Although the following tasks are primarily described with respect to the implementations of FIGS. 1-2, 4-8 and 10, the tasks may be easily modified to apply to other implementations of the present disclosure. The tasks may be iteratively performed. For example, the tasks may be repeated for each encoded block received.

The method may begin at 400. At 402, a combined block (or word) may be received at a SERDES (e.g., the SERDES 352). The combined block includes a formatted and encoded block and a SYNC header. At 404, the SERDES deserializes the combined block. At 406, a descrambler (e.g., the descrambler 356) descrambles an output of the SERDES.

A decoder (e.g., the decoder 358) decodes the encoded block. The decoding of the encoded block is designated by dashed box 405 and may include tasks 408-436. The decoding of the encoded block may include decoding Y encoded symbols to provide Y decoded output symbols. Tasks 408 and 436 are provided for example purposes only and may not be performed. At task 408, the encoded block out of the descrambler may be decoded to provide Y encoded symbols or the descrambler may provide the Y encoded symbols, which may be decoded via tasks 410-436. Task 408 may be performed, for example, when multiple levels of encoding were previously performed. The results of 406 and/or 408 may be stored in a buffer or memory, which may then be read by the decoder. The buffer or memory may be located in the descrambler, the decoder or elsewhere.

In the following tasks, each data symbol and each control code may only be read once. At 410, if the SYNC header indicates that there is one or more control codes in the Y encoded symbols, then task 412 is performed, otherwise task 434 is performed. At 412, the decoder sets a current symbol position SP=0. This refers to the current symbol position of the encoded block or decoded block depending upon whether task 408 is performed. At 414, a current pointer of the current symbol position is read. At 416, the decoder determines whether the current pointer points to the current symbol position SP. If the current pointer points to the current symbol position SP, then task 418 is performed, otherwise task 430 is performed.

At 418, the decoder reads the control code in the current symbol position SP. At 420, the decoder determines whether the encoded Y symbols include another control code. If the encoded Y symbols include another control code, task 422 is performed, otherwise task 424 is performed. At 422, the current symbol position SP is incremented. Task 414 may be performed subsequent to task 422.

At 424, the decoder determines whether the encoded Y symbols for the received combined block includes a data symbol (or another data symbol) to be read (i.e. has not yet been read). If the encoded Y symbols includes a data symbol (or another data symbol) to be read, then task 426 is performed, otherwise task 436 is performed. At 426, the current symbol position SP is incremented. At 428, a data symbol is read for the current symbol position SP.

At 430, a data symbol is read that overlaps the current symbol position SP and a next symbol position SP+1. At 432, the current symbol position SP is incremented. Task 416 may be performed subsequent to task 432. At 434, data symbols in the Y encoded data symbols are read.

At 436, the data symbols and the control codes as read out in the previous tasks may be decoded if not already decoded. The decoding of the data symbols and the control codes may be performed as the data symbols and control codes are read out in the previous tasks. Task 436 may not be performed.

The data symbols and the control codes that were read out may be concatenated as read out to provide Y concatenated symbols. Also, a result of task 436 may be Y concatenated symbols. At 438, an interface (e.g., interface 360) may deaggregate, deconcatenate, and/or demultiplex the Y concatenated symbols provided as a result of task 405.

The above-described tasks of FIGS. 9 and 11 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A data processing system comprising:
    an interface configured to receive a first plurality of symbols from one or more ports, wherein the interface is configured to aggregate a predetermined number of the first plurality of symbols to provide a second plurality of symbols; and
    an encoder configured to (i) generate a header, and (ii) encode the second plurality of symbols to generate a third plurality of symbols, wherein the header indicates whether the third plurality of symbols includes a set of control codes,
    wherein, responsive to the third plurality of symbols including the set of control codes, the encoder is configured to generate a pointer for the set of control codes, and wherein the pointer includes at least two more bits than are in the set of control codes.

2. The data processing system of claim 1, wherein:
    the one or more ports includes a plurality of ports;
    the interface is configured to receive the first plurality of symbols in an arbitrary order; and
    the first plurality of symbols includes control symbols and data symbols in an arbitrary order.

3. The data processing system of claim 2, wherein:
    some of the first plurality of symbols includes start control bits;
    the start control bits correspond respectively to the plurality of ports; and
    each of the start control bits indicates a start of a respective packet.

4. The data processing system of claim 1, wherein the encoder is configured to selectively include control codes in any of the third plurality of symbols.

5. The data processing system of claim 1, wherein the header has only a single bit.

6. The data processing system of claim 1, wherein the one or more ports includes only a single port.

7. The data processing system of claim 1, wherein:
    each of the symbols in the third plurality of symbols includes a first plurality of bits;
    the pointer includes a second plurality of bits;
    the set of control codes includes a third plurality of bits; and
    a number of bits in the first plurality of bits is greater than or equal to a number of bits in the second plurality of bits plus a number of bits in the third plurality of bits.

8. The data processing system of claim 1, wherein:
    the encoder is configured to generate an encoded block;
    the encoded block includes the third plurality of symbols; and
    a number of symbols in the encoded block is less than or equal to $2^P$, where P is a number of bits in the pointer.

9. The data processing system of claim 1, wherein the second plurality of symbols includes only ten symbols.

10. The data processing system of claim 1, wherein:
each symbol in the first plurality of symbols includes only ten bits; and
the ten bits include eight data bits and two control bits.

11. The data processing system of claim 1, wherein:
the first plurality of symbols comprise a plurality of data symbols and a plurality of control codes; and
the set of control codes is based on the plurality of control codes.

12. The data processing system of claim 1, further comprising: a scrambler configured to scramble the third plurality of symbols;
a gearbox configured to format an output of the scrambler; and a serializer/deserializer (SERDES) device configured to serialize an output of the gearbox.

13. The data processing system of claim 1, wherein:
one of the third plurality of symbols includes the set of control codes; and
each control code in the set of control codes is a bit of the set of control codes.

14. The data processing system of claim 13, wherein the one of the third plurality of symbols includes the pointer.

15. The data processing system of claim 1, wherein the pointer comprises a bit indicating whether a next set of control codes of a next symbol in the third plurality of symbols is a last set of control codes in the third plurality of symbols.

16. The data processing system of claim 15, wherein:
the encoder is configured to generate an encoded block;
the encoded block includes the third plurality of symbols; and
a number of symbols in the encoded block is equal to $2^{P-1}$, where P is a number of bits in the pointer.

17. The data processing system of claim 1, wherein the pointer points to a location where the set of control codes is located in the third plurality of symbols.

18. A method comprising:
receiving at an interface a first plurality of symbols from one or more ports;
aggregating a predetermined number of the first plurality of symbols to provide a second plurality of symbols;
generating a header; and
encoding, by an encoder, the second plurality of symbols to generate a third plurality of symbols,
wherein
the header indicates whether the third plurality of symbols includes a set of control codes,
the encoder is configured to, responsive to the third plurality of symbols including the set of control codes, generate a pointer for the set of control codes, and the pointer includes at least two more bits than are in the set of control codes.

19. The method of claim 18, wherein:
the one or more ports includes a plurality of ports;
the first plurality of symbols are received at the interface in an arbitrary order;
some of the first plurality of symbols includes start control bits;
the start control bits correspond respectively to the plurality of ports; and
each of the start control bits indicates a start of a respective packet.

20. The method of claim 18, further comprising selectively including control codes in any of the third plurality of symbols,
wherein the header has only a single bit.

21. The method of claim 18, wherein the one or more ports includes only a single port.

22. The method of claim 18, wherein:
each of the symbols in the third plurality of symbols includes a first plurality of bits;
the pointer includes a second plurality of bits;
the set of control codes includes a third plurality of bits; and
a number of bits in the first plurality of bits is greater than or equal to a number of bits in the second plurality of bits plus a number of bits in the third plurality of bits.

23. The method of claim 18, comprising generating an encoded block, wherein:
the encoded block includes the third plurality of symbols; and
a number of symbols in the encoded block is less than or equal to $2^P$, where P is a number of bits in the pointer.

24. The method of claim 18, wherein
the second plurality of symbols includes only ten symbols;
each symbol in the first plurality of symbols includes only ten bits; and
the ten bits include eight data bits and two control bits.

25. The method of claim 18, wherein:
one of the third plurality of symbols includes the set of control codes; and
each control code in the set of control codes is a bit of the set of control codes.

* * * * *